US012607761B2

(12) United States Patent
Sun et al.

(10) Patent No.: US 12,607,761 B2
(45) Date of Patent: Apr. 21, 2026

(54) INTERPOLATION OF A SEISMIC VELOCITY MODEL USING A PROJECTIONS ONTO CONVEX SETS METHOD

(71) Applicant: SAUDI ARABIAN OIL COMPANY, Dhahran (SA)

(72) Inventors: Yimin Sun, The Hague (NL); Quentin Hirsch, Delft (NL)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 439 days.

(21) Appl. No.: 18/190,777

(22) Filed: Mar. 27, 2023

(65) Prior Publication Data

US 2024/0329265 A1 Oct. 3, 2024

(51) Int. Cl.
*G01V 1/30* (2006.01)
*G01V 1/28* (2006.01)
*E21B 7/04* (2006.01)

(52) U.S. Cl.
CPC .............. *G01V 1/303* (2013.01); *G01V 1/282* (2013.01); *E21B 7/04* (2013.01)

(58) Field of Classification Search
CPC .......... E21B 7/04; G01V 1/303; G01V 1/282
See application file for complete search history.

(56) References Cited

U.S. PATENT DOCUMENTS

| | | | | |
|---|---|---|---|---|
| 7,706,211 B2 * | 4/2010 | Bakulin | ................. | G01V 1/303 |
| | | | | 367/73 |
| 11,079,507 B2 * | 8/2021 | Song | ...................... | G01V 1/325 |
| 12,174,328 B2 * | 12/2024 | Alali | ...................... | G01V 1/308 |
| 2019/0302288 A1 * | 10/2019 | Fu | .......................... | G01V 1/301 |

FOREIGN PATENT DOCUMENTS

| | | |
|---|---|---|
| CN | 105549084 A | 5/2016 |
| CN | 112445649 A | 3/2021 |

OTHER PUBLICATIONS

G. Jian-Jun et al.; "Irregular seismic data reconstruction based on exponential threshold model of POCS method*", Applied Geophysics; vol. 7; No. 3; Sep. 2010; pp. 229-238 (10 pages).

* cited by examiner

*Primary Examiner* — Elias Desta
(74) *Attorney, Agent, or Firm* — Osha Bergman Watanabe & Burton LLP

(57) ABSTRACT

Systems and methods are disclosed. The method includes obtaining a sparse seismic velocity model for a subterranean region of interest. The sparse seismic velocity model includes populated positions and missing positions, where each populated position includes a velocity. The method further includes determining an interpolated seismic velocity model by determining the velocity at each missing position using the velocity at one or more of the populated positions and interpolation. The method still further includes determining an intermediate dense seismic velocity model by updating the velocity at each missing position using, at least in part, the interpolated seismic velocity model and a projections onto convex sets method and determining a dense seismic velocity model using, at least in part, the intermediate dense seismic velocity model.

19 Claims, 12 Drawing Sheets

300

200

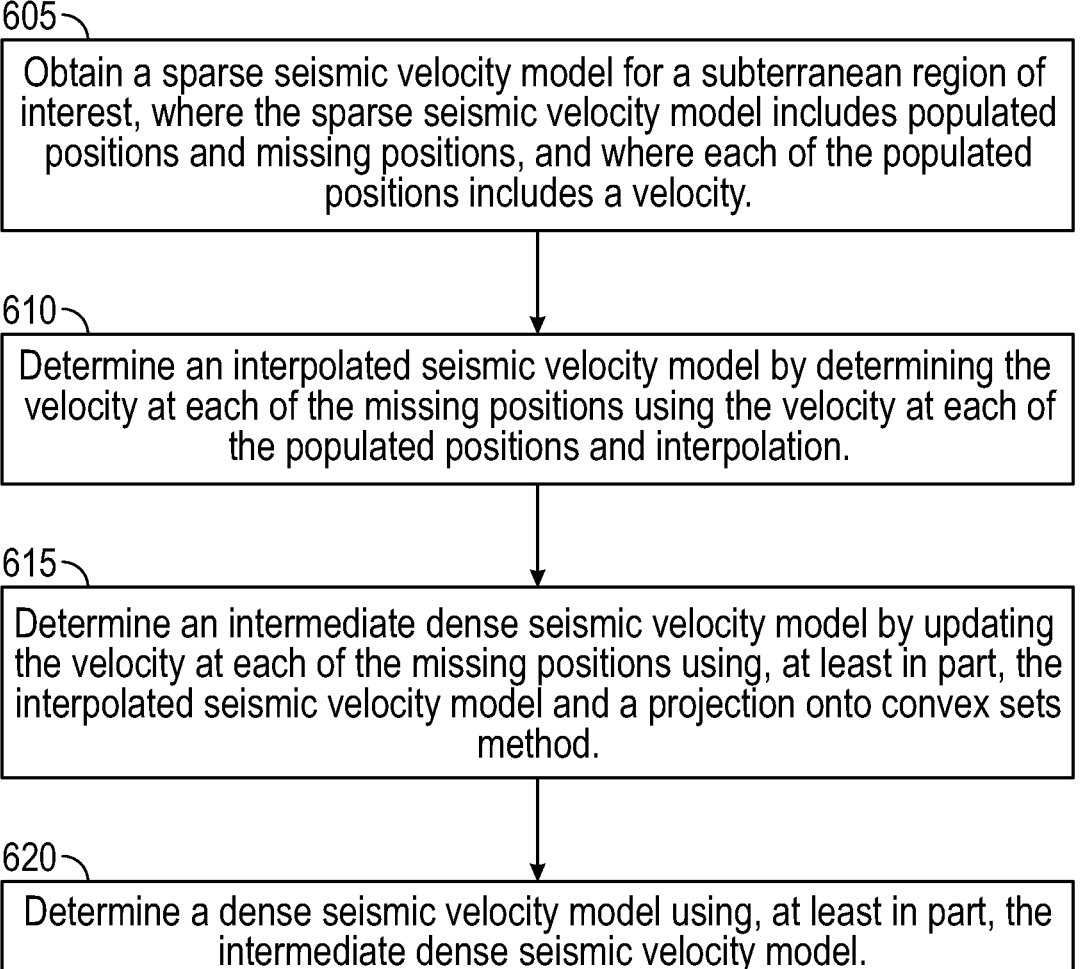

605
Obtain a sparse seismic velocity model for a subterranean region of interest, where the sparse seismic velocity model includes populated positions and missing positions, and where each of the populated positions includes a velocity.

610
Determine an interpolated seismic velocity model by determining the velocity at each of the missing positions using the velocity at each of the populated positions and interpolation.

615
Determine an intermediate dense seismic velocity model by updating the velocity at each of the missing positions using, at least in part, the interpolated seismic velocity model and a projection onto convex sets method.

620
Determine a dense seismic velocity model using, at least in part, the intermediate dense seismic velocity model.

705┐
┌─────────────────────────────┐
│  Define a threshold operator using │
│      a threshold function.         │
└─────────────────────────────┘
710┐
┌─────────────────────────────┐
│ Determine a wavenumber-domain      │
│ interpolated seismic velocity model│ ◄───────────┐
│  by applying a transform to the    │             │
│ interpolated seismic velocity model│             │
└─────────────────────────────┘              │
715┐                                                 │
┌─────────────────────────────┐              │
│  Determine an unmuted portion of   │              │
│     the wavenumber-domain          │              │
│  interpolated seismic velocity     │              │
│ model using the threshold operator.│              │
└─────────────────────────────┘              │
720┐                                    ┌─730        │
┌─────────────────────────────┐   ┌──────────────────────┐
│  Determine an intermediate seismic │   │ Update the interpolated seismic │
│   velocity model by applying an    │   │ velocity model with the         │
│  inverse transform to the unmuted  │   │ intermediate dense seismic      │
│ portion of the wavenumber-domain   │   │ velocity model.                 │
│ interpolated seismic velocity model│   └──────────────────────┘
└─────────────────────────────┘             ▲
725┐                                                │
┌─────────────────────────────┐              │
│  Determine the intermediate dense  │              │
│ seismic velocity model by replacing│              │
│  the intermediate seismic velocity │              │
│ model with the interpolated seismic│              │
│ velocity model at the populated    │              │
│         positions.                 │              │
└─────────────────────────────┘              │
```

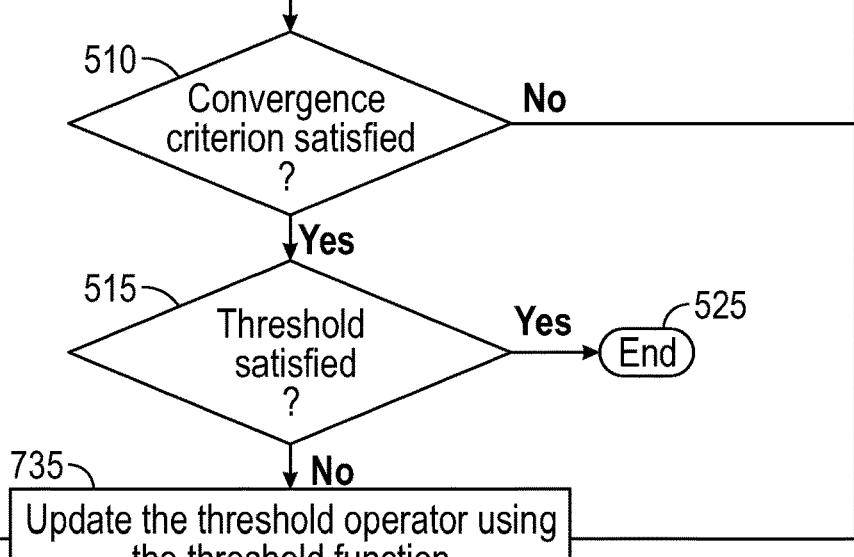

FIG. 7

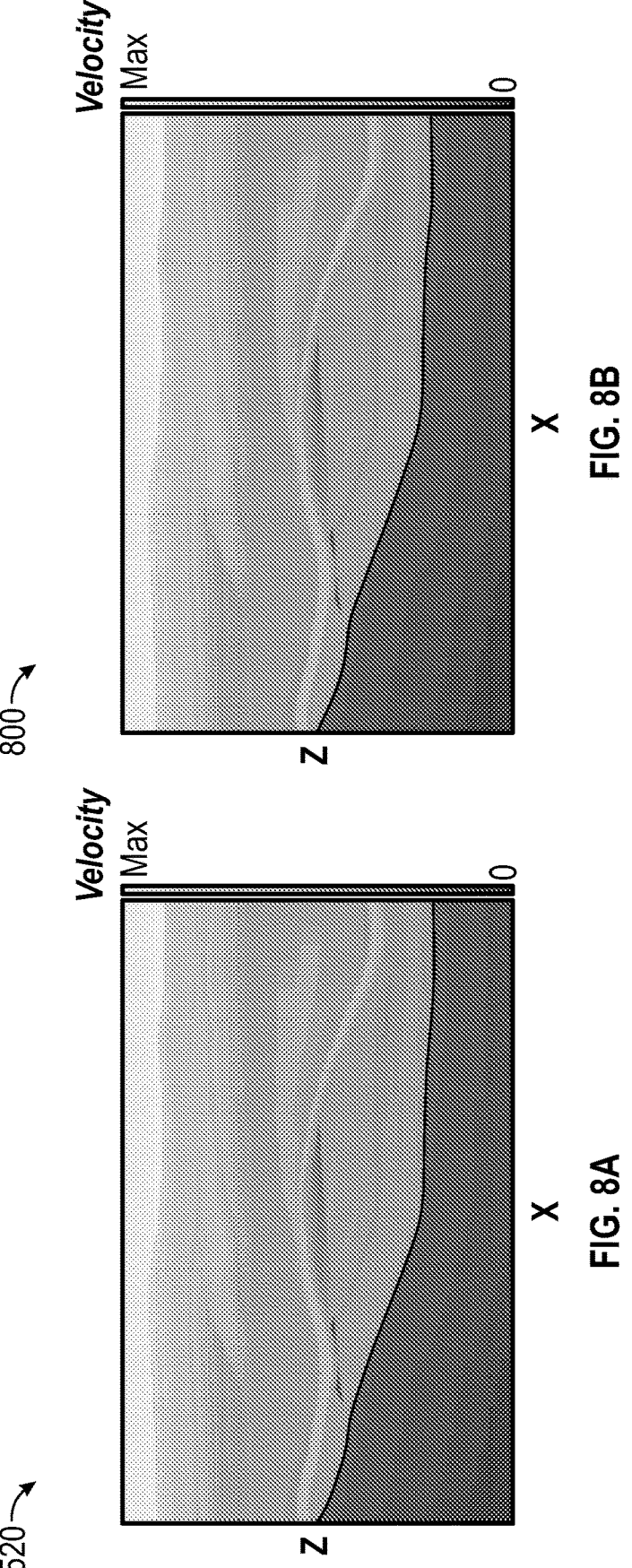

INTERPOLATION OF A SEISMIC VELOCITY MODEL USING A PROJECTIONS ONTO CONVEX SETS METHOD

BACKGROUND

As seismic waves propagate through a subterranean region of interest, the seismic waves may reflect and/or refract at geological boundaries, including the boundaries of hydrocarbon reservoirs, within the subterranean region of interest. As such, recorded seismic waves may be processed to generate a seismic image that, when displayed, may show the manifestations of the geological boundaries and the hydrocarbon reservoir. In turn, the manifestations may be used to plan and drill a wellbore path through the subterranean region of interest to penetrate the hydrocarbon reservoir and extract the hydrocarbons from the hydrocarbon reservoir.

Because the velocity of seismic waves may change when propagating through different rock and/or deeper into the subterranean region of interest, a seismic velocity model may be needed to adequately process the recorded seismic waves to generate the seismic image. However, a seismic velocity model may be sparse as generating seismic waves (or collecting other data to determine the velocity of seismic waves) uniformly and densely across a potentially vast and complex subterranean region of interest may be time consuming, expensive, and laborious.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method. The method includes obtaining a sparse seismic velocity model for a subterranean region of interest. The sparse seismic velocity model includes populated positions and missing positions, where each populated position includes a velocity. The method further includes determining an interpolated seismic velocity model by determining the velocity at each missing position using the velocity at one or more of the populated positions and interpolation. The method still further includes determining an intermediate dense seismic velocity model by updating the velocity at each missing position using, at least in part, the interpolated seismic velocity model and a projections onto convex sets method and determining a dense seismic velocity model using, at least in part, the intermediate dense seismic velocity model.

In general, in one aspect, embodiments relate to a non-transitory computer-readable memory storing computer-executable instructions that perform steps executable by a computer processor. The steps include receiving a sparse seismic velocity model for a subterranean region of interest. The sparse seismic velocity model includes populated positions and missing positions, where each populated position includes a velocity. The steps further include determining an interpolated seismic velocity model by determining the velocity at each missing position using the velocity at one or more of the populated positions and interpolation. The steps still further include determining an intermediate dense seismic velocity model by updating the velocity at each missing position using, at least in part, the interpolated seismic velocity model and a projections onto convex sets method and determining a dense seismic velocity model using, at least in part, the intermediate dense seismic velocity model.

In general, in one aspect, embodiments relate to a system. The system includes a seismic processing system and a seismic interpretation workstation. The seismic processing system is configured to receive a sparse seismic velocity model for a subterranean region of interest. The sparse seismic velocity model includes populated positions and missing positions, where each populated position includes a velocity. The seismic processing system is further configured to determine an interpolated seismic velocity model by determining the velocity at each missing position using the velocity at one or more of the populated positions and interpolation. The seismic processing system is still further configured to determine an intermediate dense seismic velocity model by updating the velocity at each missing position using, at least in part, the interpolated seismic velocity model and a projections onto convex sets method, determine a dense seismic velocity model using, at least in part, the intermediate dense seismic velocity model, receive time-domain seismic data for the subterranean region of interest, and determine depth-domain seismic data using, at least in part, the time-domain seismic data and the dense seismic velocity model. The seismic interpretation workstation is configured to generate a seismic image using, at least in part, the depth-domain seismic data and determine a depth of a hydrocarbon reservoir using, at least in part, the seismic image.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIG. 6 shows a flowchart in accordance with one or more embodiments.

FIG. 7 shows a flowchart in accordance with one or more embodiments.

FIG. 8A illustrates a dense seismic velocity model in accordance with one or more embodiments.

FIG. 8B illustrates a ground truth dense seismic velocity model in accordance with one or more embodiments.

DETAILED DESCRIPTION

Figure 1:
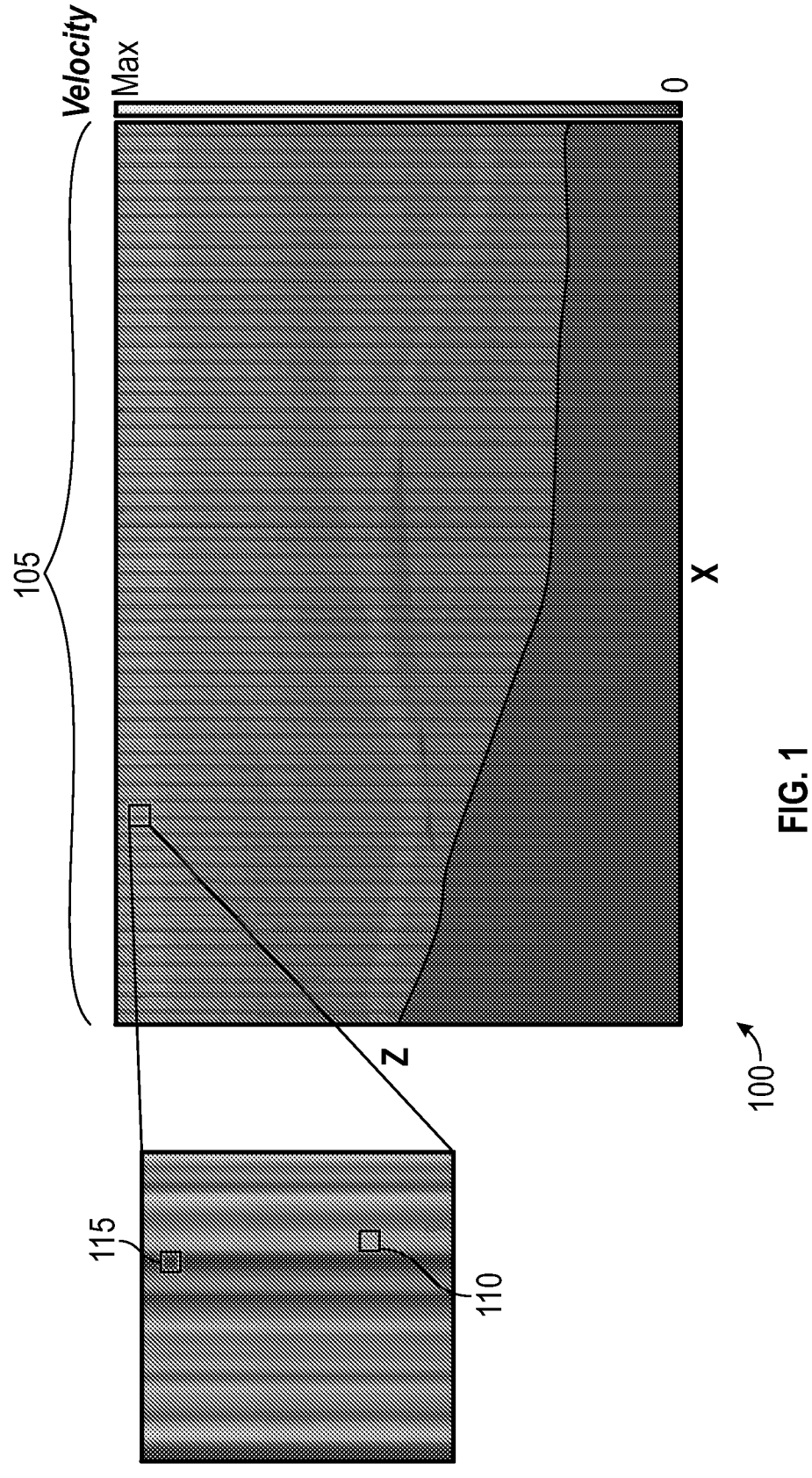
FIG. 1 illustrates a sparse seismic velocity model in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "an intermediate dense seismic velocity model" includes reference to one or more of such models.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

In the following description of FIGS. 1-12, any component described regarding a figure, in various embodiments disclosed herein, may be equivalent to one or more like-named components described regarding any other figure. For brevity, descriptions of these components will not be repeated regarding each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described regarding a corresponding like-named component in any other figure.

Methods and systems are disclosed to determine a dense seismic velocity model from a sparse seismic velocity model. Methods include applying interpolation and a projections onto convex sets (POCS) method to a sparse seismic velocity model. Systems may include a seismic processing system and a seismic interpretation workstation among other systems.

Seismic velocity models are consistently used within the seismic processing chain to convert recorded seismic waves that previously propagated through a subterranean region of interest from a time domain to a depth domain. The seismic waves may be further processed and ultimately displayed as a seismic image. The seismic image may then be interpreted to determine the depth of a hydrocarbon reservoir within the subterranean region of interest such that a wellbore path may be planned and drilled to extract the hydrocarbons within the hydrocarbon reservoir.

The present disclosure may be an improvement over other methods that determine a dense seismic velocity model. For instance, other methods may adequately determine a dense seismic velocity model from a sparse seismic velocity model with irregularly spaced missing velocities. However, acquiring a sparse seismic velocity model with regularly spaced missing velocities may be easier. The present disclosure may adequately determine a dense seismic velocity model from a sparse seismic velocity model with either regularly or irregularly spaced missing velocities.

FIG. 1 illustrates a sparse seismic velocity model 100 in accordance with one or more embodiments. In some embodiments, the sparse seismic velocity model 100 may be two dimensional as FIG. 1 shows. In other embodiments, the sparse seismic velocity model 100 may be three dimensional.

The sparse seismic velocity model 100 may sparsely represent a subterranean region of interest 105 by assigning a seismic velocity value (hereinafter also "velocity") to each of some positions within the sparse seismic velocity model 100 as shown by the scale bar in FIG. 1. Note that each pixel in FIG. 1 may represent a position. Hereinafter, a position populated with a velocity is referred to as a "populated position" 110. Further, hereinafter, each of the remaining positions within the sparse seismic velocity model 100 that are not assigned a reasonable velocity is referred to as a "missing position" 115. In some embodiments, missing positions 115 within the sparse seismic velocity model 100 may be assigned a seismic velocity value of zero, which are seen as vertical striations in FIG. 1. In other embodiments, missing positions 115 within the sparse seismic velocity model 100 may not be assigned a seismic velocity value. In some embodiments, the missing positions 115 within the sparse seismic velocity model 100 may be regularly spaced. In other embodiments, the missing positions 115 within the sparse seismic velocity model 100 may be irregularly spaced.

For illustration, FIG. 1 shows a simulated sparse seismic velocity model 100. However, in practice, a sparse seismic velocity model 100 may be determined from recorded seismic waves (hereinafter also "seismic data"), well logs, and/or rock cores acquired from the subterranean region of interest 105. The seismic data may be acquired during a seismic survey of the subterranean region of interest 105, which may be a surface seismic survey or a vertical seismic profile (VSP) survey. The surface seismic survey may use a seismic acquisition system that consists of a seismic source 5                                  6 and an array of seismic receivers located on the surface of the earth above the subterranean region of interest 105. A surface seismic survey is further discussed in reference to FIG. 9. The VSP survey may also use a seismic acquisition system that consists of one or more seismic sources and an array of seismic receivers. Either the seismic source(s) or the seismic receivers may be located on the surface of the earth above the subterranean region of interest 105 while the other is downhole within a wellbore within the subterranean region of interest 105.

Hereinafter, a sparse seismic velocity model 100 will be represented mathematically as v(x), where v is velocity and x is a position vector of any dimension within the sparse seismic velocity model 100.

An interpolation method may be used to determine an approximate seismic velocity value for each of the missing positions 115 within the sparse seismic velocity model 100 based on the velocity of one or more populated positions 110. Interpolation methods may include, but are not limited to, linear interpolation, bilinear interpolation, trilinear interpolation, bicubic interpolation, polynomial interpolation, spline interpolation, natural neighbor interpolation, inverse distance weighting interpolation, and kriging.

Figure 2:
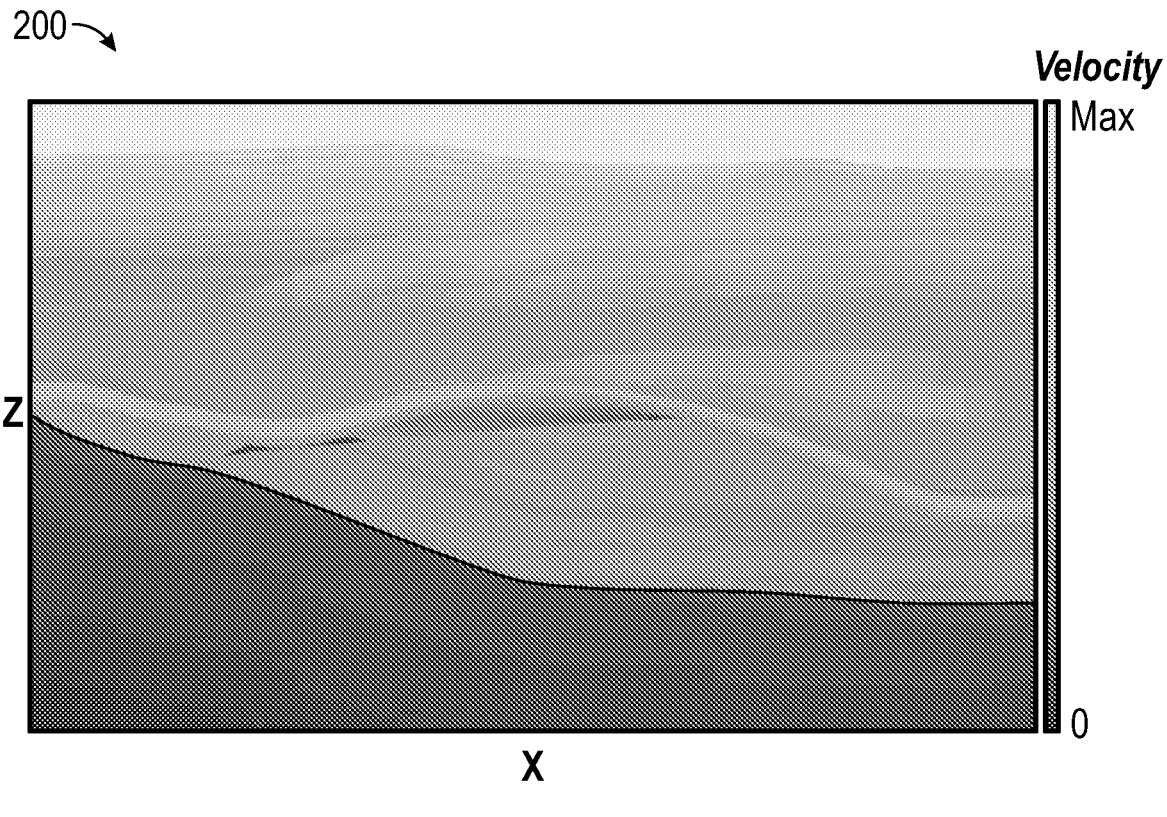
FIG. 2 illustrates an interpolated seismic velocity model in accordance with one or more embodiments.

For example, FIG. 2 illustrates an interpolated seismic velocity model 200 where the velocity at each of the missing positions 115 is determined by applying bilinear interpolation to the sparse seismic velocity model 100 shown in FIG. 1. Bilinear interpolation may be linear interpolation applied in two directions in series, such as in the x-direction and then in the z-direction in reference to FIG. 2. Note that if the sparse seismic velocity model 100 were three dimensional, bilinear interpolation may naturally extend to trilinear interpolation.

To further refine the interpolated seismic velocity model 200, a projections onto convex sets (POCS) method may be used. The POCS method may alternatively be known as the "alternating projection method." In general, a POCS method may be used to find an intersection point or a closest point between two convex sets by repeatedly alternating projections onto each of the convex sets. As alternating projections are performed, each projection will move closer and closer to an intersection point or the closest point that exists between the two convex sets. An intersection point or closest point may then be re-assigned as the velocity for the missing position 115 of interest.

Figure 3:
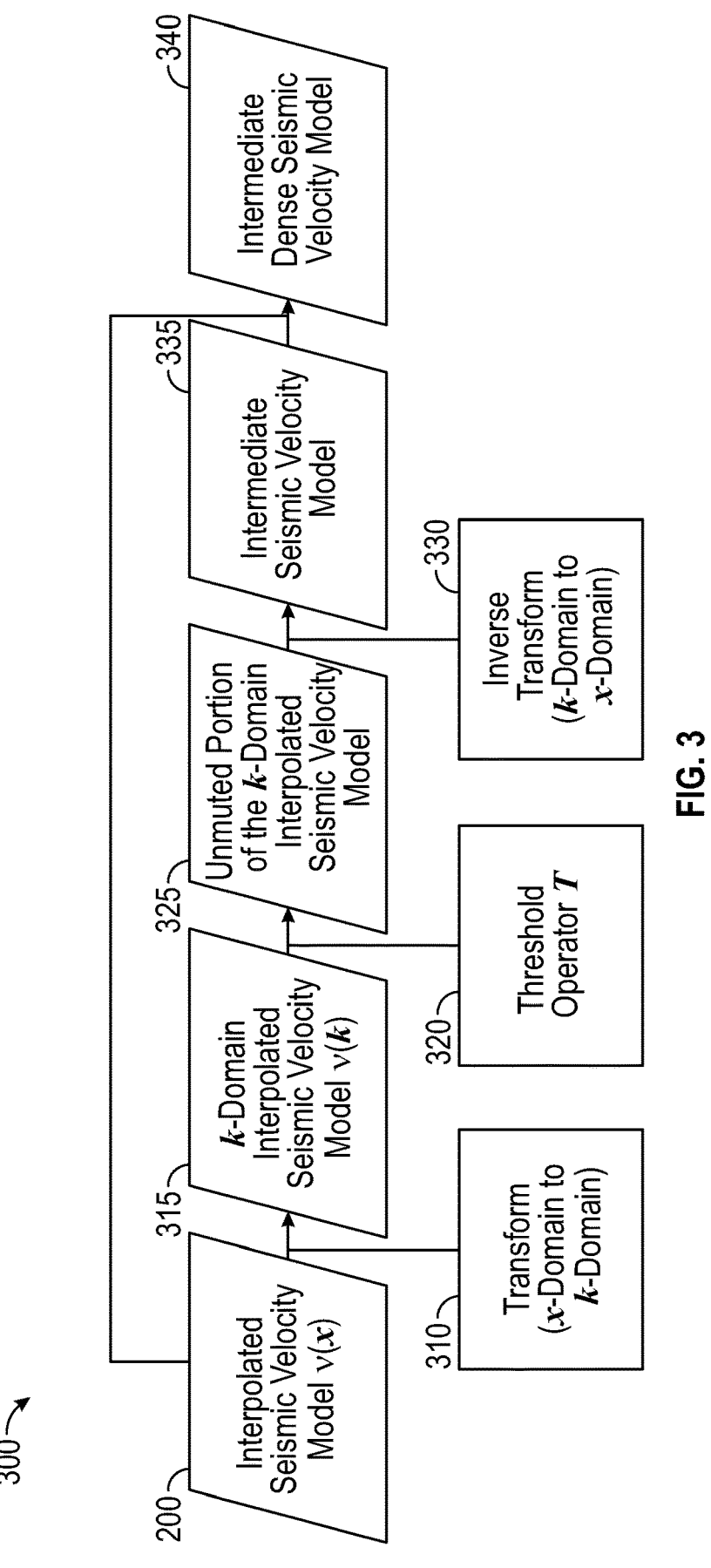
FIG. 3 shows a projections onto convex sets method in accordance with one or more embodiments.

FIG. 3 illustrates a POCS method 300 in accordance with one or more embodiments. Note that while the POCS method 300 could be described in a general sense, here, the POCS method 300 is described in the context of this disclosure. To begin, a transform 310 may be applied to the interpolated seismic velocity model 200, denoted v(x), to determine a k-domain interpolated seismic velocity model 315, denoted v(k). Here, k is a wavenumber vector of any dimension. In some embodiments, the transform 310 may be a Fourier transform. Hereinafter, a k-domain interpolated seismic velocity model 315 may be written as a "wavenumber-domain interpolated seismic velocity model."

A portion of the k-domain interpolated seismic velocity model 315 is then muted using a threshold operator 320, denoted T. In some embodiments, the threshold operator 320 may take the form of a binary matrix and is discussed in detail later. The threshold operator 320 may mute certain wavenumbers while maintaining other wavenumbers among the k-domain interpolated seismic velocity model 315. For example, the threshold operator 320 may mute small wavenumbers while maintaining large wavenumbers.

Application of the threshold operator 320 to the k-domain interpolated seismic velocity model 315 may leave an unmuted portion of the k-domain interpolated seismic velocity model 325. An inverse transform 330 may then be applied to the unmuted portion of the k-domain interpolated seismic velocity model 325 to determine an intermediate seismic velocity model 335 in the x-domain.

An intermediate dense seismic velocity model 340 may then be determined by replacing the intermediate seismic velocity model 335 with the interpolated seismic velocity model 200 at the populated positions 110.

Figures 4A, 4B, 4C, 4D, 4E:
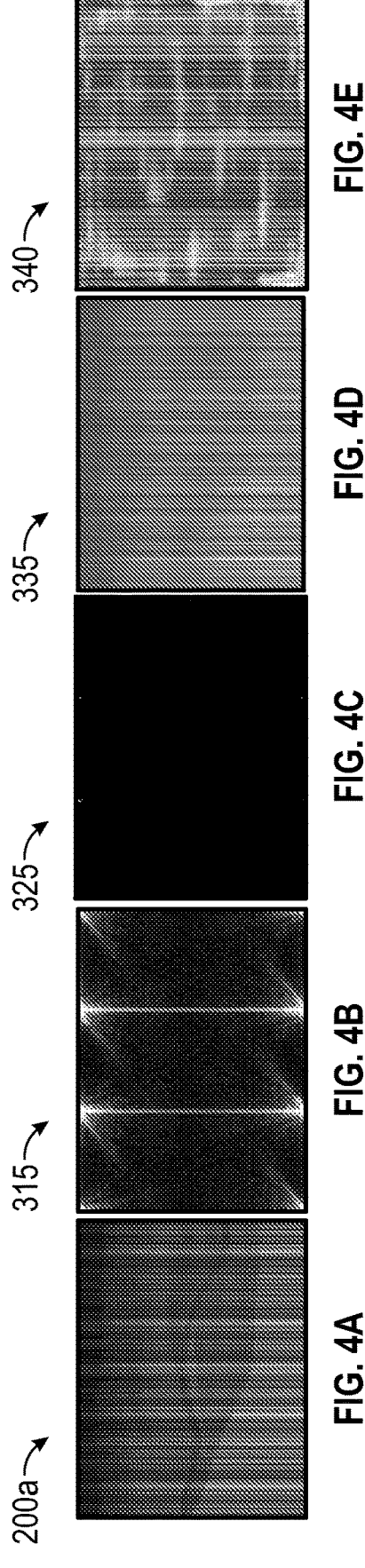
FIG. 4A illustrates an interpolated seismic velocity model in accordance with one or more embodiments.
FIG. 4B illustrates a wavenumber-domain interpolated seismic velocity model in accordance with one or more embodiments.
FIG. 4C illustrates an unmuted portion of the wavenumber-domain interpolated seismic velocity model in accordance with one or more embodiments.
FIG. 4D illustrates an intermediate seismic velocity model in accordance with one or more embodiments.
FIG. 4E illustrates an intermediate dense seismic velocity model in accordance with one or more embodiments.

FIGS. 4A-4E visually illustrate the POCS method 300 described in FIG. 3 in accordance with one or more embodiments. Specifically, FIG. 4A illustrates an interpolated seismic velocity model 200a. Here, the interpolated seismic velocity model 200a includes a velocity at each populated position 110 as well as a previously interpolated velocity at each missing position 115 within one of multiple groups q. Each group q may include the previously interpolated velocity at each of a subset of missing positions 115 within the interpolated seismic velocity model 200 shown in FIG. 2.

The transform 310 is applied to the interpolated seismic velocity model 200a to determine the k-domain interpolated seismic velocity model 315 shown in FIG. 4B. Note that the transform 310 converts the interpolated seismic velocity model 200a from the x-domain to the k-domain. The threshold operator 320 is then applied to the k-domain interpolated seismic velocity model 315 to mute some of the wavenumbers to leave the unmuted portion of the k-domain interpolated seismic velocity model 325 shown in FIG. 4C. The inverse transform 330 is applied to the unmuted portion of the k-domain interpolated seismic velocity model 325 to determine the intermediate seismic velocity model 335 shown in FIG. 4D. Note that the inverse transform 330 converts the unmuted portion of the k-domain interpolated seismic velocity model 325 from the k-domain to the x-domain. The interpolated seismic velocity model 200a then replaces the intermediate seismic velocity model 335 at the populated positions 110 to determine the intermediate dense seismic velocity model 340 shown in FIG. 4E.

Figure 5:
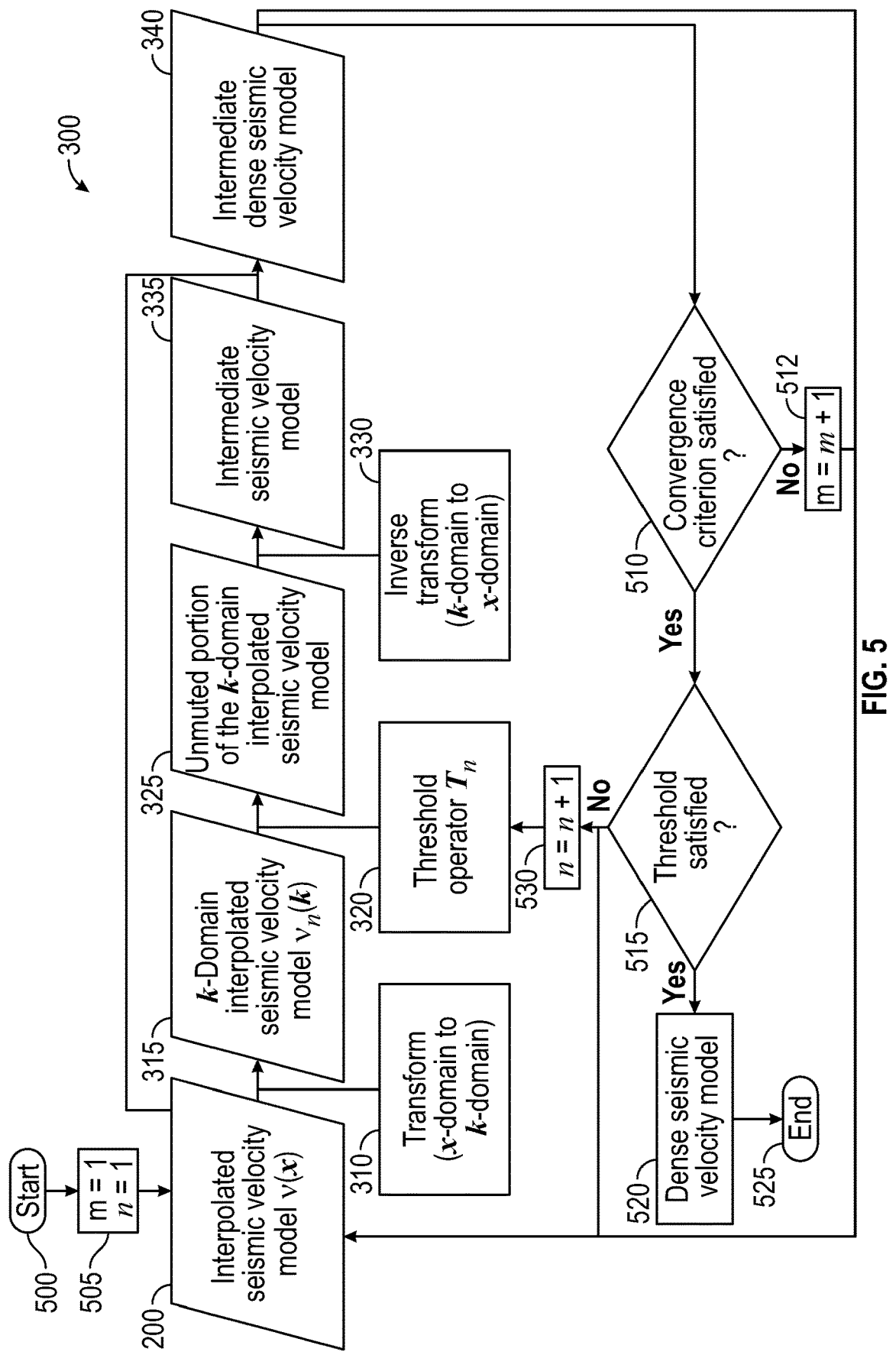
FIG. 5 shows a projections onto convex sets method in accordance with one or more embodiments.

While FIGS. 3 and 4A-4E illustrate the POCS method 300 as a non-iterative process, the POCS method 300 may be implemented as an iterative process. In some embodiments, the POCS method 300 may consist of one iterative loop. The iterative loop may end once a threshold is satisfied or once a convergence criterion is satisfied. In other embodiments, the POCS method 300 may consist of two iterative loops. FIG. 5 illustrates a POCS method 300 that consists of two iterative loops in accordance with one or more embodiments. Note that FIG. 5 is an extension of FIG. 3.

Keeping with FIG. 5, to start 500 the POCS method 300, an inner loop iteration count m and outer loop iteration count n may be initialized where m=1 and n=1, 505, respectively. The workflow outlined in reference to FIG. 3 may then be performed. Note that the k-domain interpolated seismic velocity model 315 is now denoted by $v_n(k)$ and the threshold operator 320 is now denoted by $T_n$ as either may change as the outer loop iteration count n increases.

In some embodiments, the threshold operator 320 may be defined as:

$$T_n(x) = \begin{cases} 1, & |v_{n-1}(k)| \geq p_n \\ 0, & |v_{n-1}(k)| < p_n \end{cases}, \; p_n \in p, \qquad \text{Equation (1)}$$

where p is an N-dimensional threshold set and N is a maximum number of outer loop iterations n. In some embodiments, $p=p_1, p_2, \ldots, p_N$ where $p_1>p_2> \ldots >p_N$. The elements within the set p may be defined using a threshold function. In some embodiments, the threshold function may be an exponential threshold function such as:

$$p_n = P_{max}e^{b(n-1)}, \qquad \text{Equation (2)}$$
$$n = 1, 2, \ldots N,$$

where $$b = \frac{-1}{N-1}\ln\left(\frac{P_{max}}{P_{min}}\right),$$

$P_{max}$ is the maximum wavenumber within the k-domain interpolated seismic velocity model 315, and $P_{min}$ is the minimum wavenumber within the k-domain interpolated seismic velocity model 315. In other embodiments, the threshold function may be a linear threshold function.

Based on the set p, in some embodiments, the threshold operator 320 may mute smaller and smaller wavenumbers within the k-domain interpolated seismic velocity model 315 as the outer loop iteration count n increases. Thus, less and less of the k-domain interpolated seismic velocity model 315 may be muted as the outer loop iteration count n increases.

Returning to FIG. 5, determining the intermediate dense seismic velocity model 340 completes one inner loop iteration m. Iterations performed within the inner loop may not update the outer loop iteration count n. Once the intermediate dense seismic velocity model 340 is determined, a convergence test 510 may be performed. In some embodiments, the convergence test 510 may take the form:

$$\|v_m(k) - v_{m-1}(k)\| < \alpha \cdot \|v_{m-1}(k)\|, \qquad \text{Equation (3)}$$

where $\|\cdot\|$ represents the $L^2$ norm and a is a constant. In some embodiments, $\alpha=0.0001$.

If the convergence criterion is not satisfied, the inner loop iteration count m is updated where m=m+1, 512, the intermediate dense seismic velocity model 340 replaces the interpolated seismic velocity model 200, and another inner loop iteration m is performed without updating the outer loop iteration count n. If the convergence criterion is satisfied, a threshold test 515 is performed. Note that the threshold test 515 may be a part of the outer loop. In some embodiments, the threshold test 515 may determine if a maximum number of outer loop iterations N has been performed. If the threshold is satisfied, the intermediate dense seismic velocity model 340 is selected as the dense seismic velocity model 520 and the POCS method 300 ends 525. If the threshold is not satisfied, the outer loop iteration count n is updated where n=n+1, 530. In turn, the threshold operator 320 updates, the intermediate dense seismic velocity model 340 replaces the interpolated seismic velocity model 200, and another inner loop iteration m is performed.

FIG. 6 illustrates a flowchart in accordance with one or more embodiments. In step 605, a sparse seismic velocity model 100 is obtained that represents a subterranean region of interest 105. The sparse seismic velocity model 100 may be acquired from a seismic survey, such as a surface seismic survey or a VSP survey, well logs, and/or rock cores. As described in reference to FIG. 1, the sparse seismic velocity model 100 includes populated positions 110 and missing positions 115. A seismic velocity value exists at each populated position 110. A seismic velocity value may not exist or may be set to zero at each missing position 115. The missing positions 115 may be regularly or irregularly spaced within the sparse seismic velocity model 100.

In step 610, an interpolated seismic velocity model 200 is determined. Any method of interpolation known to a person of ordinary skill in the art may be used to interpolate the seismic velocity value at each missing position 115 using the seismic velocity value at one or more populated positions 110 within the sparse seismic velocity model 100 without departing from the scope of the disclosure. In some embodiments, the interpolation method may use some of the seismic velocity values each of which are associated to a populated position 110. In other embodiments, the interpolation method may use all the seismic velocity values each of which are associated to a populated position 110. In some embodiments, the interpolation method may be selected based on computational efficiency.

In step 615, an intermediate dense seismic velocity model 340 is determined using a POCS method 300. The POCS method 300 may be an iterative process that consists of one or two loops as previously described relative to FIGS. 3, 4A-4E, and 5. Assuming the POCS method 300 is an iterative process that consists of two loops, the flowchart shown in FIG. 7 may be followed to perform the POCS method 300 in accordance with one or more embodiments.

Turning to FIG. 7, in step 705, a threshold operator 320 is defined using a threshold function. In some embodiments, the threshold function may be a linear threshold function or an exponential function such as the one shown in Equation (2). In turn, in some embodiments, the threshold operator 320 may be defined as shown in Equation (1). In reference to Equation (1), in some embodiments, the values within set p may decrease as the outer loop iteration count n increases.

In step 710, a wavenumber-domain interpolated seismic velocity model 315 is determined by applying a transform, such as a Fourier transform, to the interpolated seismic velocity model 200. For reference, FIG. 4B illustrates a wavenumber-domain interpolated seismic velocity model 315 in accordance with one or more embodiments.

In step 715, an unmuted position of the wavenumber-domain interpolated seismic velocity model 325 is determined using the threshold operator 320. For reference, FIG. 4C illustrates an unmuted position of the wavenumber-domain interpolated seismic velocity model 325 in accordance with one or more embodiments.

In step 720, an intermediate seismic velocity model 335 is determined by applying an inverse transform, such as an inverse Fourier transform, to the unmuted portion of the wavenumber-domain interpolated seismic velocity model 325. For reference, FIG. 4D shows an intermediate seismic velocity model 335 in accordance with one or more embodiments.

In step 725, an intermediate dense seismic velocity model 340 is determined by replacing the intermediate seismic velocity model 335 with the interpolated seismic velocity model 200 at the populated positions 110. For reference, FIG. 4E shows an intermediate dense seismic velocity model 340 in accordance with one or more embodiments.

In step 510, it is determined if a convergence criterion is satisfied. In some embodiments, the convergence test may take the form of Equation (3). If the convergence criterion is not satisfied, the interpolated seismic velocity model 200 is updated with the intermediate dense seismic velocity model 340 and steps 710, 715, 720, 725, and 510 are repeated. If the convergence criterion is satisfied, step 515 is performed.

In step 515, it is determined if a threshold is satisfied. In some embodiments, the threshold may be a maximum number of outer loop iterations where n=N. If the threshold is satisfied, the flowchart that describes step 615 ends 525. If the threshold is not satisfied, step 735 is performed.

In step 735, the threshold operator 320 is updated using the threshold function. In some embodiments, the threshold operator 320 may update such that smaller wavenumbers are removed when the threshold operator 320 is applied to the wavenumber-domain interpolated seismic velocity model 315 in step 715. Following step 735, step 730 is performed and steps 710, 715, 720, 725, and 510 are repeated.

In some embodiments, step 615 may be performed separately for q groups where each group includes a subset of the missing positions 115 within the interpolated seismic velocity model 200.

Returning to FIG. 6, in step 620, a dense seismic velocity model 520 is determined using the intermediate dense seismic velocity model 340. In embodiments where q=1, the intermediate dense seismic velocity model 340 may be selected as the dense seismic velocity model 520. In embodiments where q>1, a dense seismic velocity model 520 may be determined by combining intermediate dense seismic velocity models 340.

FIG. 8A illustrates a dense seismic velocity model 520 determined from the sparse seismic velocity model 100 shown in FIG. 0.1 in accordance with one or more embodiments. The dense seismic velocity model 520 includes the seismic velocity value at each of the populated positions 110 from the sparse seismic velocity model 100. The dense seismic velocity model 520 further includes the seismic velocity value at each of the missing positions 115 determined following the method described in FIGS. 6 and 7. Specifically, FIG. 8A relied on four groups (i.e., q=4) to determine the dense seismic velocity model 520.

For comparison, FIG. 8B illustrates the ground truth dense seismic velocity model 800 in accordance with one or more embodiments. In comparing FIGS. 8A and 8B, the methods described in the present disclosure adequately determine the seismic velocity value for each of the missing positions 115 within the sparse seismic velocity model 100.

In some embodiments, a dense seismic velocity model 520 may be used to convert time-domain seismic data for the subterranean region of interest 105 to depth-domain seismic data. The depth-domain seismic data may then be used to generate a seismic image. The seismic image, when displayed, may show the manifestations of geological boundaries and a hydrocarbon reservoir within the subterranean region of interest 105. Thus, the seismic image may be used to identify the depth of the hydrocarbon reservoir within the subterranean region of interest 105. A wellbore path may then be planned and drilled within the subterranean region of interest 105 to penetrate the hydrocarbon reservoir and extract the hydrocarbons.

Turning to systems, the methods described in the present disclosure may be performed using a seismic processing system. Other systems may include a seismic acquisition system, seismic interpretation workstation, wellbore planning system, and drilling system.

Figure 9:
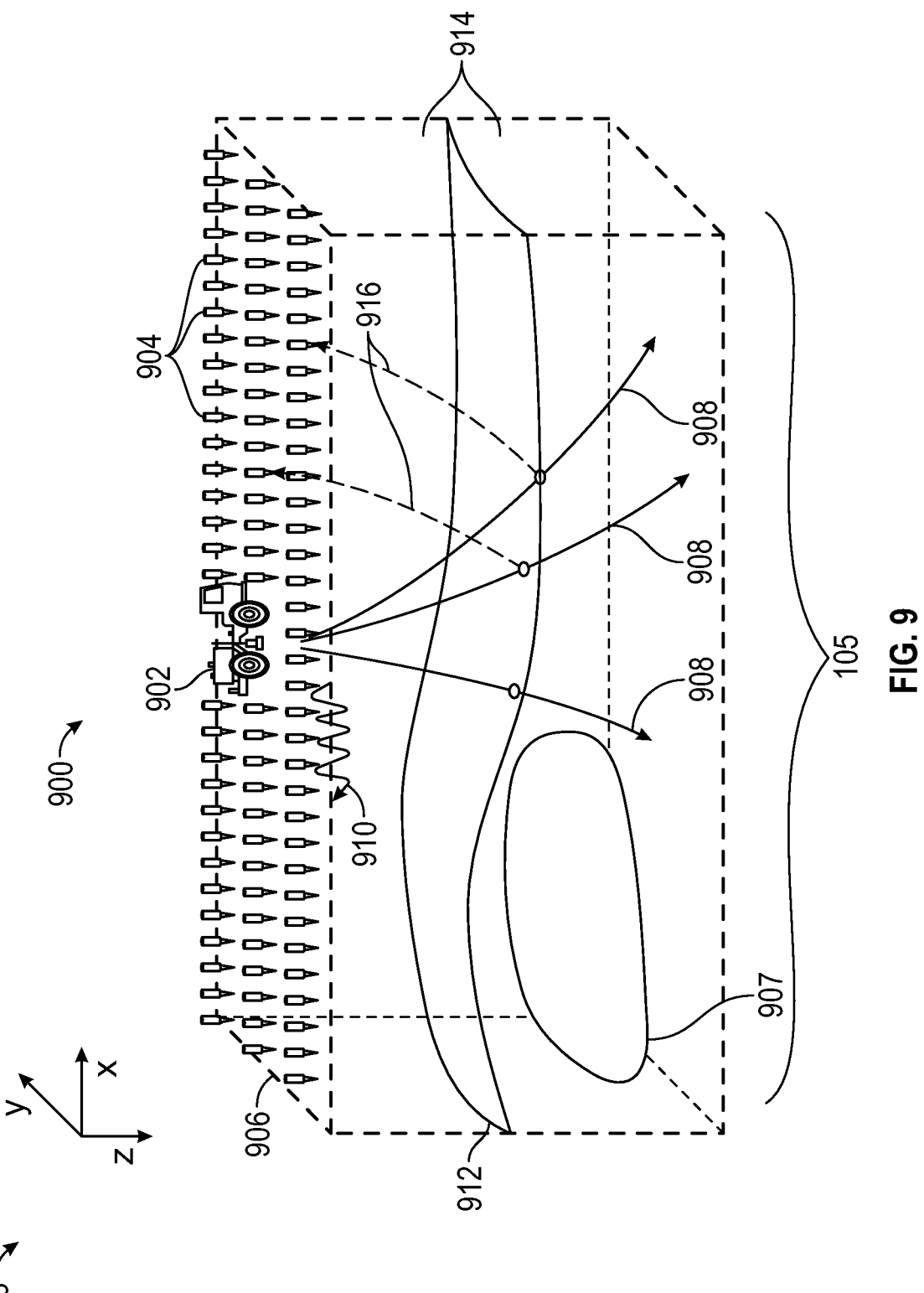
FIG. 9 shows a seismic survey in accordance with one or more embodiments.

Turning to FIG. 9, the seismic acquisition system 900 may be used to perform a surface seismic survey. The seismic acquisition system 900 may include a seismic source 902 and a plurality of seismic receivers 904 located on the surface of the earth 906 below the subterranean region of interest 105. The subterranean region of interest 105 may include a hydrocarbon reservoir 907. The seismic source 902 may emit seismic waves 908 into the subterranean region of interest 105 using a dynamite source or seismic vibrator ("vibroseis truck").

Some seismic waves 908 may propagate along the ground surface as surface waves or direct waves (alternatively "ground-roll") 910. Other seismic waves 908 may propagate into the subterranean region of interest 105, reflect (and possibly refract) one or more times at geological boundaries 912 between layers of rock 914, and return to the surface of the earth 906 as reflected seismic waves 916. Still other seismic waves 908 may propagate into the subterranean region of interest 105, refract (and possibly reflect) one or more times at geological boundaries 912 between layers of rock 914, and continue propagating into the subterranean region of interest 105 as refracted seismic waves (not shown).

The position of the seismic source 902 may be denoted by $(x_s, y_s)$ where x and y represent orthogonal axes 918 on the surface of the earth 906 above the subterranean region of interest 105. Further, the position of each seismic receiver 904 may be denoted by $(x_r, y_r)$. Each seismic receiver 904 may record a time series that represents the amplitude of ground motion caused by the emitted seismic waves 908 at a sequence of discrete times t. The time series may be denoted a "seismic trace." As such, a series of seismic traces may make up five-dimensional "seismic data" denoted $S(x_s, y_s, x_r, y_r, t)$.

Figure 10:
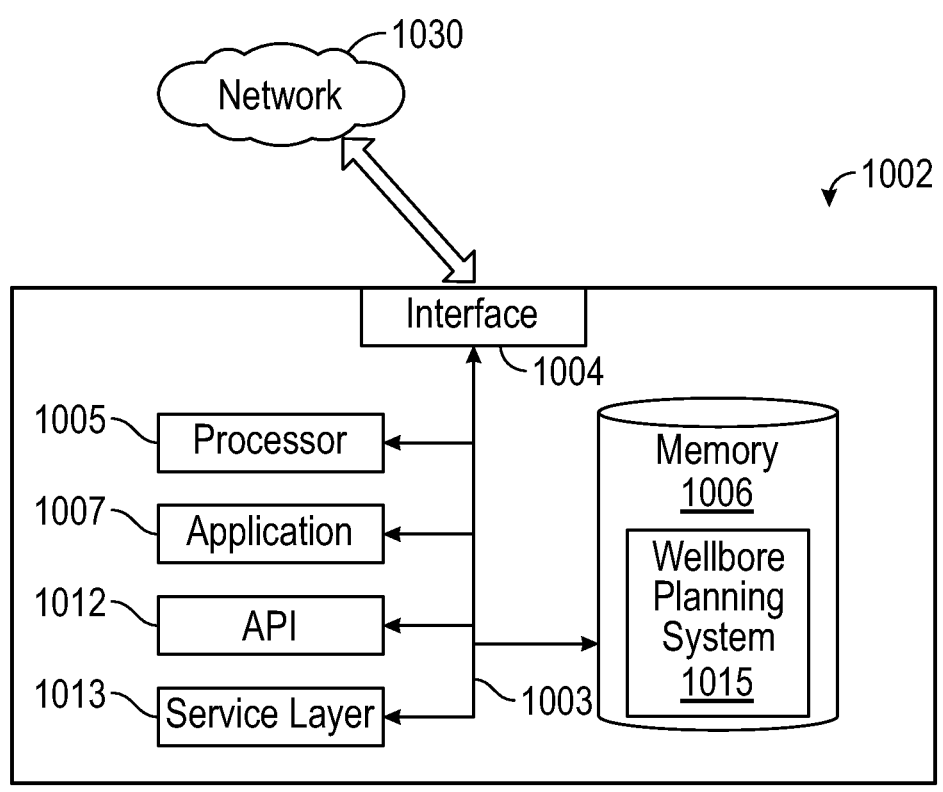
FIG. 10 illustrates a computer in accordance with one or more embodiments.

Turning to FIG. 10, FIG. 10 illustrates a generic computer 1002 in accordance with one or more embodiments. The computer 1002 may be specifically configured for seismic processing and denoted a "seismic processing system." Alternatively, the computer 1002 may be specifically configured for seismic interpretation and denoted a "seismic interpretation workstation." The computer 1002 is intended to depict any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 1002 may include an input device, such as a keypad, keyboard, touch screen, or other device that can accept user information, and an output device that displays information, including digital data, visual or audio information (or a combination of both), or a graphical user interface. Specifically, a seismic interpretation workstation may include a robust graphics card for the detailed rendering of the seismic image that may be displayed and manipulated in a virtual reality system using 3D goggles, a mouse, or a wand to identify a depth of a hydrocarbon reservoir 907.

The computer 1002 can serve in a role as a client, network component, server, database, or any other component (or a combination of roles) of a computer system 1002 as required for seismic processing and seismic interpretation. The illustrated computer system 1002 is communicably coupled with a network 1030. For example, a seismic processing system and a seismic interpretation workstation may be communicably coupled using a network 1030. In some implementations, one or more components of each computer system 1002 may be configured to operate within environments, including cloud-computing-based, local, global, or other environment (or a combination of environments).

At a high level, the computer system 1002 is an electronic computing device operable to receive, transmit, process, store, and/or manage data and information associated with seismic processing and seismic interpretation. According to some implementations, the computer system 1002 may also include or be communicably coupled with an application server, e-mail server, web server, caching server, streaming data server, business intelligence (BI) server, or other server (or a combination of servers).

Because seismic processing and seismic interpretation may not be sequential, the computer system 1002 can receive requests over network 1030 from other computer systems 1002 or another client application and respond to the received requests by processing the requests appropriately. In addition, requests may also be sent to the computer system 1002 from internal users (for example, from a command console or by other appropriate access method), external or third-parties, other automated applications, as well as any other appropriate entities, individuals, systems, or computer systems 1002.

Each of the components of the computer system 1002 can communicate using a system bus 1003. In some implementations, any or all of the components of each computer system 1002, both hardware or software (or a combination of hardware and software), may interface with each other or the interface 1004 (or a combination of both) over the system bus 1003 using an application programming interface (API) 1012 or a service layer 1013 (or a combination of the API 1012 and service layer 1013. The API 1012 may include specifications for routines, data structures, and object classes. The API 1012 may be either computer-language independent or dependent and refer to a complete interface, a single function, or even a set of APIs. The service layer 1013 provides software services to each computer system 1002 or other components (whether or not illustrated) that are communicably coupled to each computer system 1002. The functionality of each computer system 1002 may be accessible for all service consumers using this service layer 1013. Software services, such as those provided by the service layer 1013, provide reusable, defined business functionalities through a defined interface. For example, the interface may be software written in JAVA, C++, or other suitable language providing data in extensible markup language (XML) format or another suitable format. While illustrated as an integrated component of each computer system 1002, alternative implementations may illustrate the API 1012 or the service layer 1013 as stand-alone components in relation to other components of each computer system 1002 or other components (whether or not illustrated) that are communicably coupled to each computer system 1002. Moreover, any or all parts of the API 1012 or the service layer 1013 may be implemented as child or sub-modules of another software module, enterprise application, or hardware module without departing from the scope of this disclosure.

The computer system 1002 includes an interface 1004. Although illustrated as a single interface 1004 in FIG. 10, two or more interfaces 1004 may be used according to particular needs, desires, or particular implementations of each computer system 1002. The interface 1004 is used by each computer system 1002 for communicating with other systems in a distributed environment that are connected to the network 1030. Generally, the interface 1004 includes logic encoded in software or hardware (or a combination of software and hardware) and operable to communicate with the network 1030. More specifically, the interface 1004 may include software supporting one or more communication protocols associated with communications such that the network 1030 or interface's hardware is operable to communicate physical signals within and outside of the illustrated computer 1002.

The computer system 1002 includes at least one computer processor 1005. Generally, a computer processor 1005 executes any instructions, algorithms, methods, functions, processes, flows, and procedures as described in the instant disclosure. A computer processor 1005 may be a central processing unit (CPU) and/or a graphics processing unit (GPU). A dense seismic velocity model 520 and seismic data may be hundreds of terabytes in size. To efficiently determine the dense seismic velocity model 520 and process the seismic data, a seismic processing system may consist of an array of CPUs with one or more subarrays of GPUs attached to each CPU. Further, tape readers or high-capacity hard-drives may be connected to the CPUs using wide-band system buses 1003.

The computer system 1002 also includes a memory 1006 that stores data and software for the computer system 1002 or other components (or a combination of both) that can be connected to the network 1030. For example, the memory 1006 may store a wellbore planning system 1015 in the form of software that is used to plan a wellbore path. Although illustrated as a single memory 1006 in FIG. 10, two or more memories may be used according to particular needs, desires, or particular implementations of the computer system 1002 and the described functionality. While memory 1006 is illustrated as an integral component of each computer system 1002, in alternative implementations, memory 1006 can be external to each computer system 1002.

The application 1007 is an algorithmic software engine providing functionality according to particular needs, desires, or particular implementations of the computer system 1002, particularly with respect to functionality described in this disclosure. For example, application 1007 can serve as one or more components, modules, applications, etc. Further, although illustrated as a single application 1007, the application 1007 may be implemented as multiple applications 1007 on each computer system 1002. In addition, although illustrated as integral to each computer system 1002, in alternative implementations, the application 1007 can be external to each computer system 1002.

There may be any number of computers 1002 associated with, or external to, a seismic processing system and a seismic interpretation workstation, where each computer system 1002 communicates over network 1030. Further, the term "client," "user," and other appropriate terminology may be used interchangeably as appropriate without departing from the scope of this disclosure. Moreover, this disclosure contemplates that many users may use the computer system 1002, or that one user may use multiple computer systems 1002.

Figure 11:
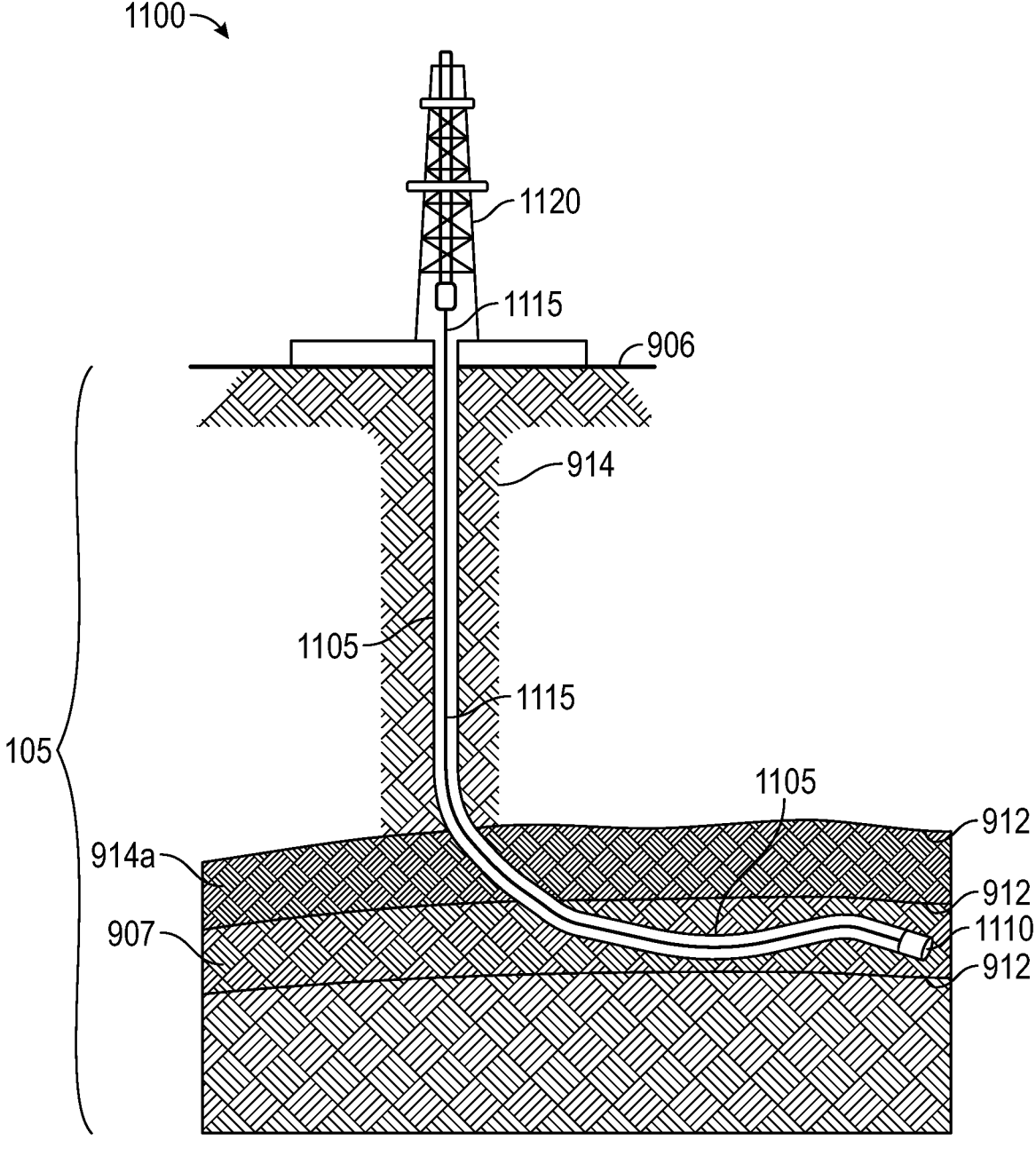
FIG. 11 illustrates a drilling system in accordance with one or more embodiments.

FIG. 11 illustrates a drilling system 1100 in accordance with one or more embodiments. Once a wellbore path has been planned using the wellbore planning system 1015, the planned wellbore path may be transferred to the drilling system 1100. The drilling system 1100 may then drill a wellbore 1105 along the planned wellbore path to penetrate the hydrocarbon reservoir 907 within the subterranean region of interest 105. The wellbore 1105 may be drilled using a drill bit 1110 attached to a drillstring 1115 further attached to a drill rig 1120, where the drill rig 1120 is located on the surface of the earth 906. The wellbore 1105 may traverse layers of rock 914, including one or more layer of cap-rock 914*a*, and geological boundaries 912 to ultimately penetrate the hydrocarbon reservoir 907. During or following drilling of the wellbore 1105, a VSP survey may be performed, well logs collected, and/or rock cores collected and analyzed in a laboratory. In turn, the VSP survey, well logs, and/or rock cores may be used, at least in part, to determine a sparse seismic velocity model 100. Once the wellbore 1105 is drilled and completed, hydrocarbons may be produced from the hydrocarbon reservoir 907 to the surface of the earth 906.

Figure 12:
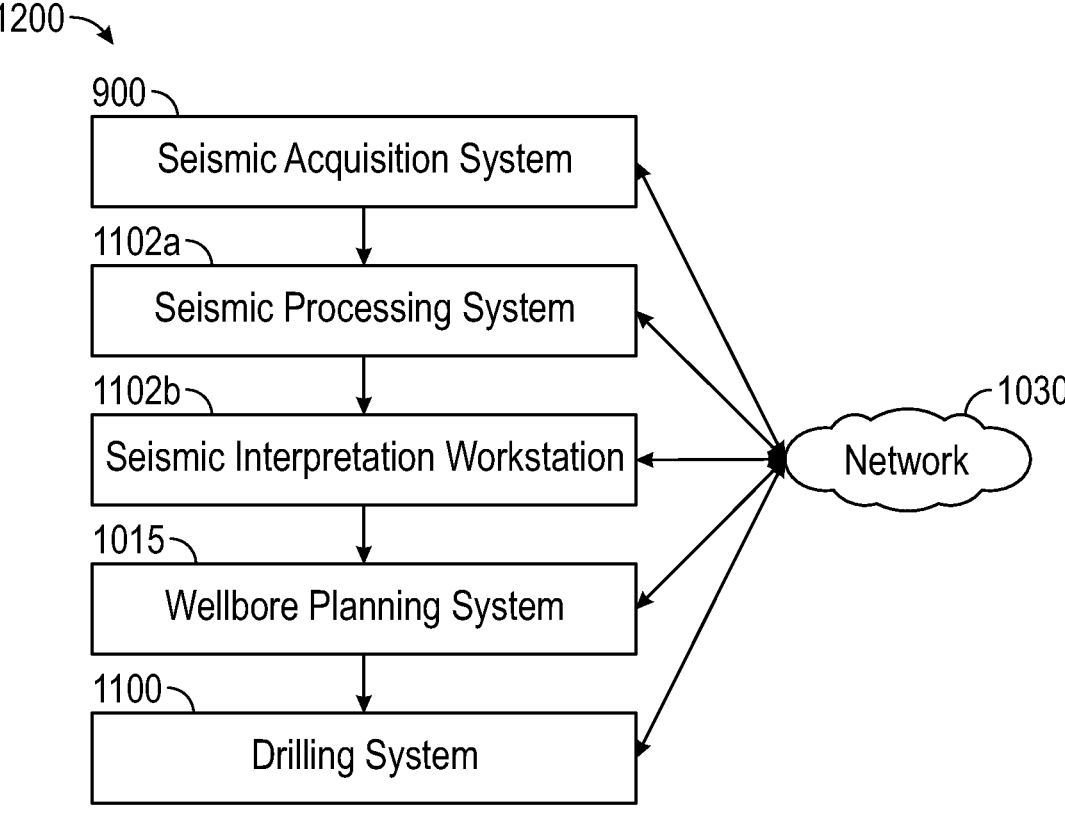
FIG. 12 illustrates systems in accordance with one or more embodiments.

FIG. 12 illustrates a flowchart of systems 1200 in accordance with one or more embodiments. A seismic acquisition system 900 may be configured to obtain seismic data for a subterranean region of interest 105 as described relative to FIG. 9.

The seismic data may be input into, stored on, and processed using a seismic processing system 1102a as described relative to FIG. 10. Processing may include attenuating artifacts and amplifying manifestations of geological boundaries 912 and a hydrocarbon reservoir 907 within the subterranean region of interest 105. Further, the seismic processing system 1102a may be used to perform the methods described in the present disclosure to determine a dense seismic velocity model 520. In turn, the dense seismic velocity model 520 and the seismic data may be used to ultimately determine the seismic image.

The seismic image may be transferred to and stored on a seismic interpretation workstation 1102b via a network 1030 as described relative to FIG. 10. The seismic image may then be displayed on the seismic interpretation workstation 1102b. The seismic image may display the manifestations of geological boundaries 912 and the hydrocarbon reservoir 907 within the subterranean region of interest 105. A seismic interpreter may manually manipulate the displayed seismic image using the seismic interpretation workstation 1102b to identify and label the manifestations of the geological boundaries 912 and the hydrocarbon reservoir 907 within the subterranean region of interest 105.

The labeled seismic image may be loaded into the wellbore planning system 1015 located on a memory 1006 of a computer 1002. A user of the computer 1002 may use the labeled seismic image loaded into the wellbore planning system 1015 to plan a wellbore path that penetrates the hydrocarbon reservoir 907.

The planned wellbore path may be loaded into a drilling system 1100. The drilling system 1100 may be configured to drill a wellbore 1105 within the subterranean region of interest 105 along the planned wellbore path. Following drilling and completion of the wellbore 1105, the wellbore 1105 may be used to produce hydrocarbons from the hydrocarbon reservoir 907 to the surface of the earth 906.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method comprising:
obtaining a sparse seismic velocity model for a subterranean region of interest,
wherein the sparse seismic velocity model comprises a plurality of populated positions and a plurality of missing positions, and
wherein each of the plurality of populated positions comprises a velocity;
determining, using a computer processor, an interpolated seismic velocity model by determining the velocity at each of the plurality of missing positions using the velocity at populated positions within the plurality of populated positions and interpolation;
determining, using the computer processor, an intermediate dense seismic velocity model by updating the velocity at each of the plurality of missing positions using, at least in part, the interpolated seismic velocity model and projections onto convex sets method;
determining, using the computer processor, a dense seismic velocity model using the intermediate dense seismic velocity model;
obtaining, using a seismic acquisition system, time-domain seismic data for the subterranean region of interest;
determining, using a seismic processing system, depth-domain seismic data using the time-domain seismic data and the dense seismic velocity model; and
generating, using the seismic processing system, a seismic image using the depth-domain seismic data.

2. The method of claim 1, further comprising:
determining, using a seismic interpretation workstation, a depth of a hydrocarbon reservoir using the seismic image; and
planning, using a wellbore planning system, a wellbore path to penetrate the hydrocarbon reservoir.

3. The method of claim 2, further comprising drilling, using a drilling system, a wellbore along the wellbore path.

4. The method of claim 1, wherein the plurality of missing positions is irregularly spaced within the sparse seismic velocity model.

5. The method of claim 1, wherein the projections onto convex sets method comprises:
defining a threshold operator using a threshold function; and
iteratively, until a threshold is satisfied:
iteratively, until a convergence criterion is satisfied:
determining a wavenumber-domain interpolated seismic velocity model by applying a transform to the interpolated seismic velocity model;
determining an unmuted portion of the wavenumber-domain interpolated seismic velocity model using the threshold operator;
determining an intermediate seismic velocity model by applying an inverse transform to the unmuted portion of the wavenumber-domain interpolated seismic velocity model;
determining the intermediate dense seismic velocity model by replacing the intermediate seismic velocity model with the interpolated seismic velocity model at the plurality of populated positions; and
updating the interpolated seismic velocity model with the intermediate dense seismic velocity model, and
updating the threshold operator using the threshold function.

6. The method of claim 5, wherein the convergence criterion comprises a difference between the wavenumber-domain interpolated seismic velocity model from two inner loop iterations.

7. The method of claim 6, wherein the convergence criterion further comprises a convergence constant.

8. The method of claim 5, wherein the threshold comprises a maximum number of outer loop iterations.

9. The method of claim 5, wherein the threshold function comprises an exponential threshold function.

10. The method of claim 5, wherein the threshold operator mutes smaller amplitudes as outer loop iterations increase.

11. The method of claim 5, wherein the transform comprises a Fourier transform.

12. A non-transitory computer-readable memory having computer-executable instructions stored thereon that, when executed by a computer processor, perform steps comprising:

receiving a sparse seismic velocity model for a subterranean region of interest, wherein the sparse seismic velocity model comprises a plurality of populated positions and a plurality of missing positions, and wherein each of the plurality of populated positions comprises a velocity;

determining an interpolated seismic velocity model by determining the velocity at each of the plurality of missing positions using the velocity at populated positions within the plurality of populated positions and interpolation;

determining an intermediate dense seismic velocity model by updating the velocity at each of the plurality of missing positions using the interpolated seismic velocity model and projections onto convex sets method;

determining a dense seismic velocity model using the intermediate dense seismic velocity model;

receiving time-domain seismic data for the subterranean region of interest;

determining depth-domain seismic data using the time-domain seismic data and the dense seismic velocity model; and generating a seismic image using the depth-domain seismic data.

13. The non-transitory computer-readable memory of claim 12, wherein the projections onto convex sets method comprises:

receiving a threshold function;

defining a threshold operator using the threshold function; and iteratively, until a threshold is satisfied:

iteratively, until a convergence criterion is satisfied:

determining a wavenumber-domain interpolated seismic velocity model by applying a transform to the interpolated seismic velocity model;

determining an unmuted portion of the wavenumber-domain interpolated seismic velocity model using the threshold operator;

determining an intermediate seismic velocity model by applying an inverse transform to the unmuted portion of the wavenumber-domain interpolated seismic velocity model;

determining the intermediate dense seismic velocity model by replacing the intermediate seismic velocity model with the interpolated seismic velocity model at the plurality of populated positions; and updating the interpolated seismic velocity model with the intermediate dense seismic velocity model, and updating the threshold operator using the threshold function.

14. The non-transitory computer-readable memory of claim 13, wherein the convergence criterion comprises a difference between the wavenumber-domain interpolated seismic velocity model from two inner loop iterations.

15. The non-transitory computer-readable memory of claim 13, wherein the threshold comprises a maximum number of outer loop iterations.

16. A system comprising:

a seismic processing system configured to:

receive a sparse seismic velocity model for a subterranean region of interest, wherein the sparse seismic velocity model comprises a plurality of populated positions and a plurality of missing positions; and wherein each of the plurality of populated positions comprises a velocity, determine an interpolated seismic velocity model by determining the velocity at each of the plurality of missing positions using the velocity at populated positions within the plurality of populated positions and interpolation, determine an intermediate dense seismic velocity model by updating the velocity at each of the plurality of missing positions using the interpolated seismic velocity model and projections onto convex sets method, determine a dense seismic velocity model using the intermediate dense seismic velocity model, receive time-domain seismic data for the subterranean region of interest, and determine depth-domain seismic data using the time-domain seismic data and the dense seismic velocity model; and a seismic interpretation workstation configured to:

generate a seismic image using the depth-domain seismic data, and determine a depth of a hydrocarbon reservoir using the seismic image.

17. The system of claim 16, further comprising a wellbore planning system configured to plan a wellbore path to penetrate the hydrocarbon reservoir.

18. The system of claim 17, further comprising a drilling system configured to drill a wellbore along the wellbore path.

19. The system of claim 16, further comprising a seismic acquisition system configured to obtain the sparse seismic velocity model and the time-domain seismic data from the subterranean region of interest.

* * * * *